(12) United States Patent
Shin et al.

(10) Patent No.: US 10,722,820 B2
(45) Date of Patent: Jul. 28, 2020

(54) APPARATUS FOR SEPARATING LIQUID-GAS

(71) Applicant: LG CHEM, LTD., Seoul (KR)

(72) Inventors: Dae Young Shin, Daejeon (KR); Eun Jung Joo, Daejeon (KR); Chang Hoe Heo, Daejeon (KR); Sung Keun Jang, Daejeon (KR); Joon Ho Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 273 days.

(21) Appl. No.: 15/525,839

(22) PCT Filed: Nov. 25, 2015

(86) PCT No.: PCT/KR2015/012718
§ 371 (c)(1),
(2) Date: May 10, 2017

(87) PCT Pub. No.: WO2016/099047
PCT Pub. Date: Jun. 23, 2016

(65) Prior Publication Data
US 2017/0354905 A1    Dec. 14, 2017

(30) Foreign Application Priority Data

Dec. 16, 2014    (KR) ........................ 10-2014-0181102

(51) Int. Cl.
*B01D 19/00*    (2006.01)
*B01D 45/12*    (2006.01)

(52) U.S. Cl.
CPC ......... *B01D 19/0068* (2013.01); *B01D 19/00* (2013.01); *B01D 19/001* (2013.01);
(Continued)

(58) Field of Classification Search
None
See application file for complete search history.

(56) References Cited

U.S. PATENT DOCUMENTS 4,339,398 A * 7/1982 Feres ...................... B01J 19/32
261/89
7,338,546 B2    3/2008 Eliasson et al.
(Continued)

FOREIGN PATENT DOCUMENTS

CN    102046255 A    5/2011
CN    201873903 U    6/2011
(Continued)

*Primary Examiner* — Christopher P Jones
*Assistant Examiner* — Phillip Y Shao
(74) *Attorney, Agent, or Firm* — Dentons US LLP (57) ABSTRACT

The present invention relates to a gas/liquid separator. According to an aspect of the present invention, provided is a gas/liquid separator, including a housing including a first supply part and a second supply part; a rotary shaft rotatably provided to the housing; a drive unit configured to rotate the rotary shaft; fixed cones disposed in an interior of the housing and each including a tilted area, diameters of which are decreased in a direction from the first supply part to the second supply part, a first through-hole, which passes the rotary shaft, and at least one second through-hole, through which a second fluid introduced via the second supply part passes; and rotary cones disposed in an interior of the housing so as to be spaced apart from the fixed cones and installed at the rotary shaft so as to rotate about the rotary shaft.

11 Claims, 5 Drawing Sheets

(52) U.S. Cl.
CPC ..... *B01D 19/0026* (2013.01); *B01D 19/0057*
(2013.01); *B01D 45/12* (2013.01)

(56) References Cited

U.S. PATENT DOCUMENTS

| | | |
|---|---|---|
| 2003/0233939 A1 | 12/2003 | Szeppessy et al. |
| 2007/0249479 A1 | 10/2007 | Eliasson et al. |

FOREIGN PATENT DOCUMENTS

| | | |
|---|---|---|
| CN | 103561858 A | 2/2014 |
| CN | 103561860 A | 2/2014 |
| CN | 104870071 A | 8/2015 |
| CN | 104884157 A | 9/2015 |
| CN | 105008010 A | 10/2015 |
| EP | 0191625 A2 | 8/1986 |
| JP | 61-274705 A | 12/1986 |
| KR | 10-2010-0021695 A | 2/2010 |
| KR | 10-0961765 | 6/2010 |
| KR | 10-2012-0114848 | 10/2012 |
| KR | 10-2012-0132419 | 12/2012 |

\* cited by examiner

【Figure 6】

APPARATUS FOR SEPARATING LIQUID-GAS

The present application is a National Stage Application No. PCT/KR2015/012718, filed Nov. 25, 2015, and claims the benefit of Korean Patent Application No. 10-2014-0181102 filed on Dec. 16, 2014 with the Korean Intellectual Property Office, all of which are hereby incorporated by reference in their entirety for all purposes as if fully set forth herein.

TECHNICAL FIELD

The present invention relates to a gas/liquid separator, and more particularly, to a gas/liquid separator, in which a stripping agent and a vaporized VOC smoothly flow to an upper part thereof.

BACKGROUND ART

A spinning cone column (SCC) is a gas/liquid separator constituted of multi-staged rotary cones, which rotate about a rotary shaft, and fixed cones, which do not rotate. The spinning cone column has an advantage in that a residence time of a raw material reactant is improved.

In particular, when a fluid is fed into an upper part of a rotary cone from an upper part of a column, the fluid is spread as a thin film on a surface of the rotary cone by centrifugal force and flows to a lower part of the rotary cone. At the same time, when a stripping agent is fed into a lower part of the column, VOCs in a fluid are removed.

In general, a gas/liquid separator is operated under a vacuum condition such that vaporization of VOCs is satisfactorily carried out. Meanwhile, a stripping agent fed via a lower part of a column might not flow up to an upper part of the column in a process of migrating to the upper part of the column along narrow paths between the rotary cones and the fixed cones and may be condensed. In this case, when the stripping agent is condensed, separation efficiency is decreased. In addition, when VOCs separated from the fluid do not rapidly flow to the upper part of the column, the VOCs may be dissolved again.

DISCLOSURE

Technical Problem

Therefore, the present invention has been made in view of the above problems, and it is an object of the present invention to provide a gas/liquid separator allowing smooth flow of a stripping agent.

It is an object of the present invention to provide a gas/liquid separator to rapidly discharge vaporized VOC.

Technical Solution

In accordance with an aspect of the present invention, the above and other objects can be accomplished by the provision of A gas/liquid separator, including a housing including a first supply part and a second supply part; a rotary shaft rotatably provided in the housing; a drive unit configured to rotate the rotary shaft; a fixed cone disposed in an interior of the housing and including a tilted area, diameters of which are decreased in a direction from the first supply part to the second supply part, a first through-hole, which passes the rotary shaft, and at least one second through-hole, through which a second fluid introduced via the second supply part passes; and a rotary cone disposed in an interior of the housing so as to be spaced apart from the fixed cones and installed at the rotary shaft so as to rotate about the rotary shaft.

In addition, the diameter of the first through-hole may be larger than the diameter of the second through-hole.

In addition, the number of second through-holes may be larger than the number of first through-holes.

In addition, the fixed cones may include a partition wall to prevent a first fluid introduced via the first supply part from being introduced into the second through-hole.

In addition, a partition wall may be provided so as to envelop at least a portion of the second through-hole along a circumference of the second through-hole.

In addition, the partition wall may be extended from a surface of the fixed cone so as to have a height smaller than intervals between the rotary cones and the fixed cones.

In addition, the partition wall may be formed to have a closed curve along a circumference of the second through-hole.

In addition, a portion of the partition wall may be open along a circumference of the second through-hole.

In addition, the second through-hole may be disposed in the tilted area having a decreased diameter.

In addition, second through-holes may be provided in a circumference direction with respect to the rotary shaft.

In addition, the first and second supply parts may be respectively disposed at different heights along a height direction of the housing.

In accordance with another aspect of the present invention, there is provided a gas/liquid separator, including: a housing including a first supply part and a second supply part disposed at different heights; a rotary shaft rotatably provided in the housing; a drive unit configured to rotate the rotary shaft; a fixed cone disposed in an interior of the housing and including a tilted area, diameters of which are decreased in a direction from the first supply part to the second supply part, a first through-hole, which passes the rotary shaft, at least one second through-hole, through which a second fluid introduced via the second supply part passes, and a cap for enveloping at least a portion of the second through-hole; and a rotary cone disposed in an interior of the housing so as to be spaced apart from the fixed cones and installed at the rotary shaft so as to rotate about the rotary shaft.

In addition, the cap may be extended from a surface of each of the fixed cones so as to have a tilt angle different from tilted areas of the fixed cones.

In addition, the cap may have a diameter equal to or larger than diameter of the second through-hole.

In addition, the cap may be provided such that an interval between the cap and the second through-hole increases toward the first through-hole.

In addition, the diameter of the second through-hole may be smaller than the diameter of the first through-hole, and the number of second through-holes may be greater than the number of first through-holes.

In addition, the second through-hole and the cap may be provided at the tilted area of the fixed cone.

Advantageous Effects

As described above, a gas/liquid separator according to an embodiment of the present invention has the following effects.

Since the gas/liquid separator includes fixed cones including through-holes through which a fluid flows, a stripping agent (e.g., steam) fed from a lower part of the separator and vaporized VOC can smoothly flow to an upper part of the separator.

Accordingly, steam smoothly flows up to an upper part of the separator without being condensed, and thus, the VOC concentration may be lowered and vaporization of VOC is facilitated. In addition, the vaporized VOC can be prevented from being dissolved in a liquid again.

In addition, caps or partition walls are provided to envelop the through-holes. Therefore, a liquid-type raw material can be prevented from flowing to a lower part of the separator via the through-holes.

MODES OF THE INVENTION

Hereinafter, a gas/liquid separator according to an example of the present invention will be described in detail with reference to the attached drawings.

Figure 1:
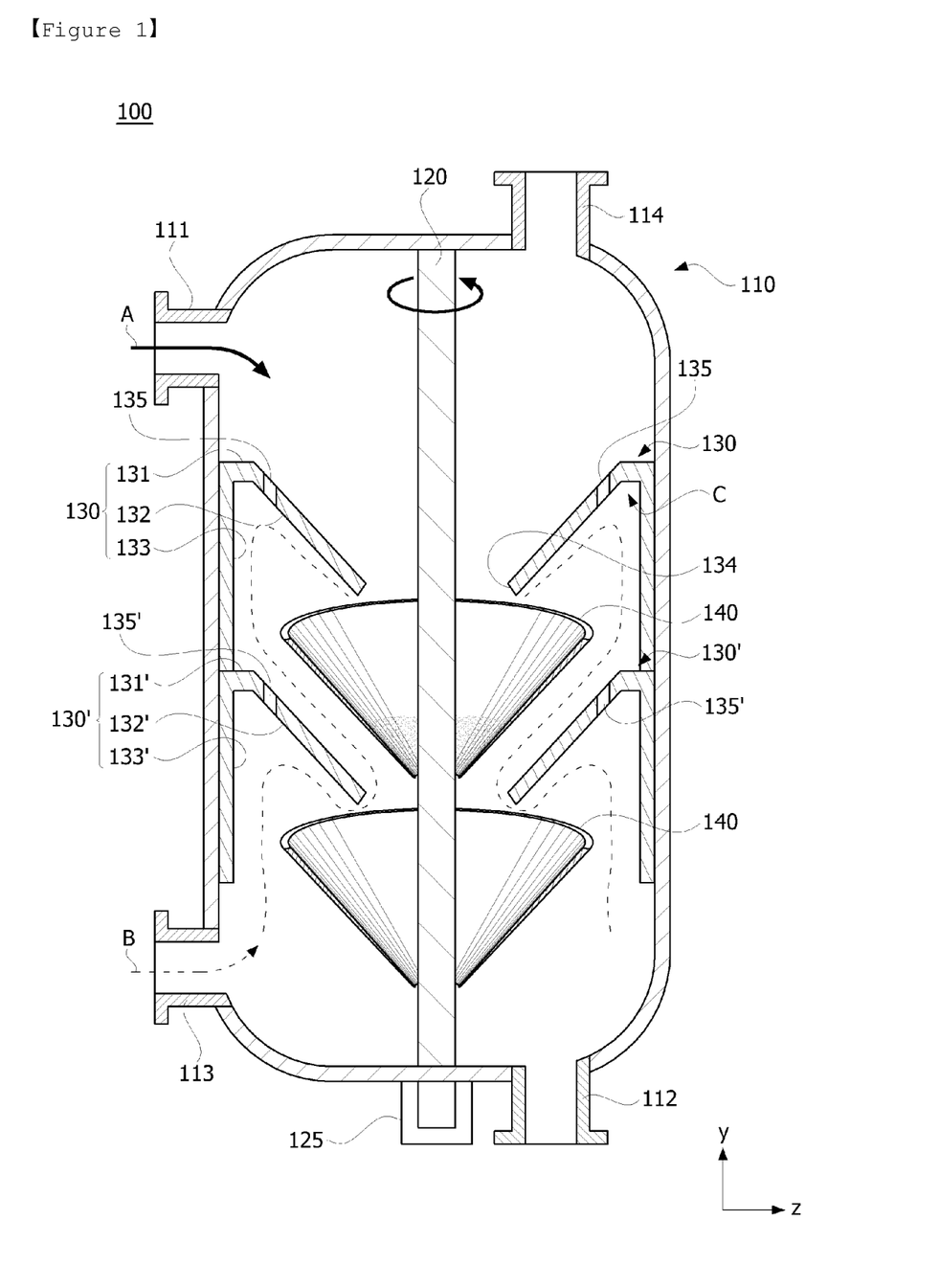
FIG. 1 is a sectional view illustrating a gas/liquid separator according to an example of the present invention.

In addition, the same or similar reference numerals in the drawings denote the same or similar elements, regardless of figure numbers, and a repeated explanation thereof will not be given. The size and shape of each of illustrated elements may be exaggerated or reduced for convenience of description FIG. 1 is a sectional view illustrating a gas/liquid separator 100 according to an example of the present invention.

In this specification, the gas/liquid separator 100 may perform a process of reacting a reactant A (also called 'first fluid' or 'liquid-type raw material') with a steam B (also called 'second fluid' or 'stripping agent') to remove a volatile organic compound (VOC) from the reactant A.

Here, a chemical reaction between the first fluid and the second fluid is not essential. For example, the gas/liquid separator 100 may be used to separate a predetermined material by contacting steam. In particular, the gas/liquid separator 100 may be used to separate a volatile organic compound contained in a liquid-type mixture (e.g., polymer) by bring the liquid-type mixture into contact with steam.

However, the mixture is not limited to a two-component-system mixture in which a gas-type material is dissolved in a liquid-type material, and may be a three-component-system mixture containing an additional solid material. In addition, the gas/liquid separator 100 may be used in a separation process of a three-component-system material as well as a separation process of a two-component-system material.

The gas/liquid separator 100 according to an example of the present invention includes a housing 110, which includes first and second supply parts 111 and 113, a rotary shaft 120, which is rotatably provided in the housing 110, and a drive unit 125, which drives the rotary shaft 120. In addition, the gas/liquid separator 100 respectively includes one or more fixed cones 130 and 130' and one or more rotary cones 140.

In particular, the gas/liquid separator 100 includes the rotary cone 140 installed at the rotary shaft 120 to rotate about the rotary shaft 120. The rotary cone 140 are disposed in the interior of the housing 110 such that the rotary cone 140 are spaced apart from the fixed cone 130. In addition, the gas/liquid separator 100 may include a plurality of the rotary cones 140 respectively installed in a height direction (y-axis direction) of the rotary shaft 120.

The gas/liquid separator 100 is supported by the housing 110 and includes the fixed cone 130 for guiding the flow of a fluid. The gas/liquid separator 100 may include a plurality of the fixed cones 130 and 130'. Here, all of the plurality of fixed cones may have the same structure. The fixed cones 130 and 130' are supported by the housing 110 to guide the flow of a fluid, and the diameters of the fixed cones 130 and 130' are decreased along a flow direction of a fluid from upper parts thereof to lower parts thereof. In particular, the fixed cones 130 and 130' are disposed at the interior of the housing 110, and include tilted areas, the diameters of which decrease from the first supply part 111 to the second supply part 113. In addition, each of the fixed cones 130 includes a first through-hole 134 to pass the rotary shaft 120 and at least one second through-hole 135 through which a second fluid B introduced via the second supply part 113 passes.

In addition, the rotary shaft 120 is connected to the drive unit 125, as a motor, and the drive unit 125 serves to rotate the rotary shaft 120.

In addition, the rotary cone 140 may be provided such that the diameter of the rotary cone 140 is reduced from upper parts thereof to lower parts thereof with respect to a height direction (y-axis direction) of the housing 110. In particular, the rotary cone 140 may have a tubular truncated cone shape, the diameter of which decreases from an upper part to a lower part.

In addition, each of the plurality of fixed cones 130 and 130' may be supported by and/or fixed to the housing 110 while being spaced apart from each other by a predetermined interval.

In addition, the fixed cones 130 and 130' and the rotary cones 140 may be alternately disposed along a height direction (y-axis direction) of the rotary shaft 120.

Meanwhile, referring to FIG. 1, any one of the fixed cone 130 may be disposed at the uppermost part of the housing 110 along a height direction of the housing 110. In particular, the fixed cone 130 may be installed at the uppermost part and the rotary cone 140 and the fixed cone 130' may be alternately installed at lower parts along a height direction of the rotary shaft 120. Alternatively, any one of the rotary cone 140 may be disposed at the uppermost part along a height direction of the housing 110. In particular, a rotary cone 140 may be installed at the uppermost part and the fixed cone 130' and the rotary cone 140 may be sequentially installed at lower parts, along a height direction of the rotary shaft 120.

Meanwhile, for convenience of description, fixed cones disposed at the uppermost part may be indicated as first fixed cone 130 and the other fixed cone 130' may be indicated as second fixed cone 130', along a height direction (y-axis direction) of the rotary shaft 120. In particular, the first fixed cone 130 is disposed between the first supply part 111 and the rotary cone 140. Here, the first and second fixed cones 130 and 130' may have the same structure and size. However, second through-holes 135 and 135' respectively provided in the first and second fixed cones 130 and 130' might not be present at the same axis with respect to any axis parallel to the rotary shaft 120. In addition, the sizes and numbers of the second through-holes 135 and 135' respectively provided in the first and second fixed cones 130 and 130' may be different.

The fixed cones 130 and 130' are supported by the housing 110 such that the flow of a first fluid A passing through the first supply part 111 is guided. Here, the fixed cone 130 may be supported by the housing 110 while contacting the housing 110 or may be fixed to the housing 110 by a separate fastener.

Meanwhile, the housing 110 includes the first supply part 111 for feeding the first fluid (e.g., reactant such as polymer), the second supply part 113 for feeding the second fluid (e.g., steam), and first and second outlets 112 and 114.

In addition, the first and second supply parts 111 and 113 may be respectively disposed at different heights along a height direction (y-axis direction, see FIG. 1) of the housing 110 (or the rotary shaft). In an example, the first supply part 111 may be disposed at an upper part of the housing 110 and the second supply part 113 may be disposed at a lower part of the housing 110.

In particular, the first supply part 111 may be disposed at a side of an upper part of the housing 110. Accordingly, the first supply part 111 may be provided such that the first fluid is introduced in a radial direction (z-axis direction) of the rotary shaft 120. The first fluid introduced into the housing 110 via the first supply part 111 sequentially flows to the first fixed cone 130 and the rotary cone 140.

Here, when the first fluid passing through the first supply part 111 is fed into the rotary cone 140 via the first fixed cone 130 or directly, the first fluid is spread on surfaces of the rotary cone 140 in a thin film shape by centrifugal force and flows to the fixed cone 130' located at a lower part.

In addition, the first outlet 114 may be disposed at an upper part of the housing 110. In addition, the second supply part 113 may be disposed at a side of a lower part of the housing 110. In addition, the second outlet 112 may be disposed at a lower part of the housing 110.

Here, since the first fluid moves to a lower part along a height direction (y-axis direction) of the housing 110 due to gravity, the first supply part 111 for supplying the first fluid may be disposed at an upper part (upper part in height direction) of the housing 110. Here, two or more first supply parts 111 may be provided so as to provide two or more reactants.

In addition, since the second fluid (steam) reacts with or contacts the first fluid while moving toward an upper part of a height direction of the housing 110 which is opposite a flow direction of the first fluid, the second supply part 113 for supplying the second fluid may be disposed at a lower part of the housing 110.

Meanwhile, residual gas (or vaporized VOC) may be discharged through the first outlet 114, and the first fluid, a volatile organic compound of which is removed by contact with the second fluid, may be discharged through the second outlet 112 to the outside.

In particular, the first fluid introduced into the housing 110 via the first supply part 111 flows in a direction of gravity and then may be discharged through the second outlet 112 to the outside of the housing 110. In addition, the second fluid (steam) introduced via the second supply part 113 may be discharged through the first outlet 114 to the outside of the housing 110.

Figure 2:
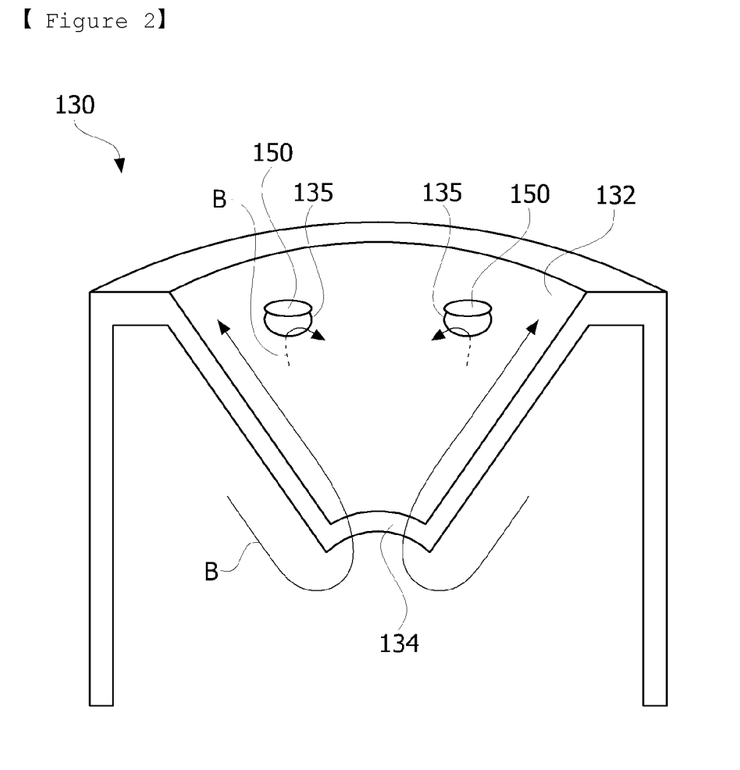
FIG. 2 is a perspective view of a fixed cone constituting a gas/liquid separator according to a first example of the present invention.
Figure 3:
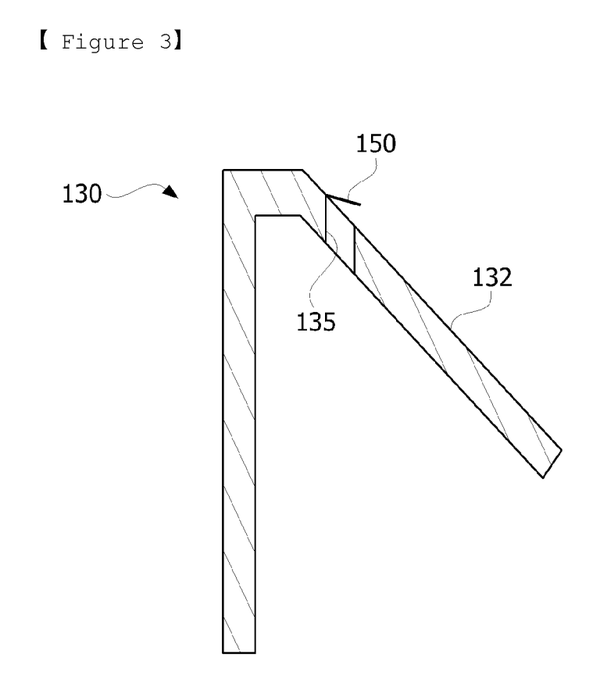
FIG. 3 is a sectional view of the fixed cone illustrated in FIG. 2.

FIG. 2 is a perspective view of a fixed cone constituting a gas/liquid separator according to the first example of the present invention, and FIG. 3 is a sectional view of the fixed cone illustrated in FIG. 2.

Referring to FIG. 1, the second fluid (steam) flows to an upper part of the housing 110 along a narrow path between the fixed cone 130 and the rotary cone 140. Here, the second fluid or the vaporized VOC may become stagnant in area "C". As described above, such stagnation of the second fluid may lower separation efficiency. In addition, due to the stagnation of the vaporized VOC, the vaporized VOC might not be discharged with steam and may be dissolved in a reactant again.

So as to prevent such a stagnation phenomenon, the fixed cones 130 and 130' respectively include the first through-hole 134, which passes the rotary shaft 120, and at least one second through-hole 135 or 135', through which the second fluid B introduced via the second supply part 113 passes. First through-holes 134 function as a path of the second fluid B and a path for installation of the rotary shaft 120, and the second through-holes 135 and 135' are provided as paths of the second fluid B and the vaporized VOC.

Here, the diameters of the first through-holes 134 may be set to be larger than those of the second through-holes 135 and 135'. In addition, the number of the second through-holes 135 and 135' may be greater than the number of the first through-holes 134. In an aspect, a plurality of the second through-holes 135 and 135' may be provided along the center of the first through-holes 134. Accordingly, in area "C" in which stagnation generally occurs, the flow of the second fluid B and a vaporized VOC may be increased by the second through-holes 135 and 135'.

Referring to FIGS. 2 and 3, a fixed cone 130 includes caps 150, each of which envelops at least a portion of each of the second through-holes 135. The cap 150 prevent the first fluid A flowing along a surface of the fixed cone 130 from passing through the second through-hole 135 and flowing to a lower part of the housing 110.

The cap 150 may be extended from a surface of the fixed cone 130 so as to have a tilt angle different from a tilt angle of a tilted area 132 of the fixed cone 130. The cap 150 may be provided on a surface of the fixed cone 130 into which the first fluid is introduced via the first supply part 111 or the rotary cone 140. In addition, the cap 150 may have diameters equal to or larger than those of the second through-holes 135. That is, the diameter of the cap 150 may be the same as or larger than those of the second through-holes 135. For example, the diameter of the cap 150 may be about 10% to about 20% larger than those of the second through-holes 135. In addition, the caps 150 may be provided such that an interval between each of the caps 150 and each of the second through-holes 135 increases toward the first through-hole 134. In addition, the second through-holes 135 and the caps 150 may be respectively disposed at the tilted area 132 of the fixed cones 130.

Meanwhile, the fixed cones 130 and 135' may include circumference areas 131 and 131', which are supported by the housing 110, and tilted areas 132 and 132', which extend toward the rotary shaft and the diameters of which decrease from an upper part to a lower part. In addition, the fixed cones 130 and 135' may include spacers 133 and 133' for maintaining intervals between the fixed cones 130 and 135'. Here, the spacers 133 and 133' may be extended from the circumference areas 131 and 131' and contact the housing 110.

Figure 4:
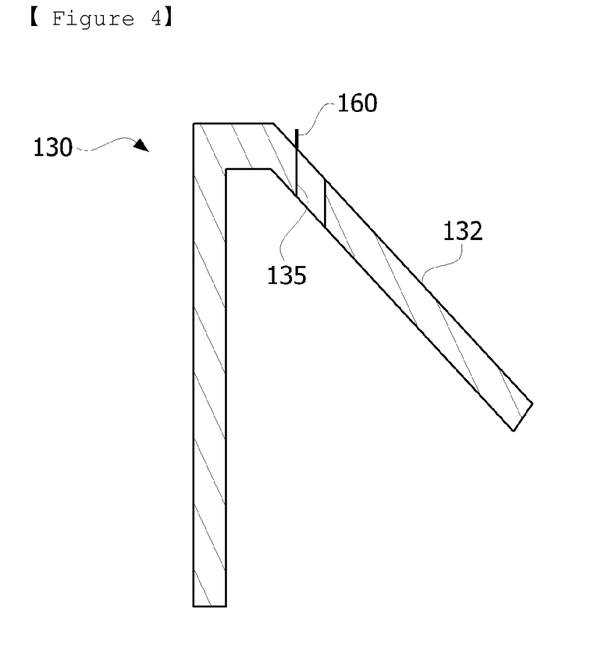
FIG. 4 is a perspective view of a fixed cone constituting a gas/liquid separator according to a second example of the present invention.
Figure 5:
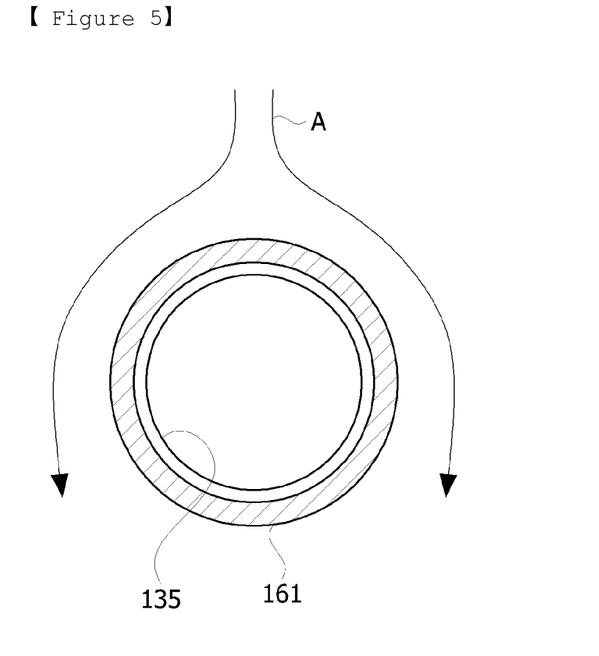
FIGS. 5 and 6 are plan views of the fixed cone illustrated in FIG. 4.
Figure 6:
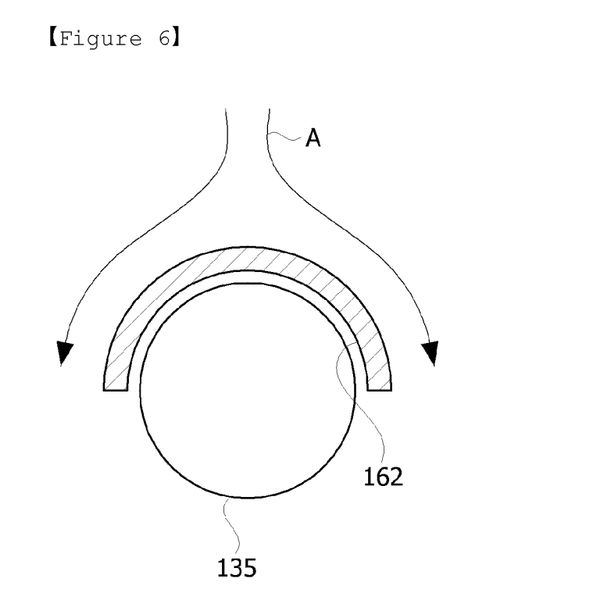

FIG. 4 is a perspective view of a fixed cone constituting a gas/liquid separator according to a second example of the present invention, and FIGS. 5 and 6 are plan views of the fixed cone illustrated in FIG. 4.

The fixed cone 130 may include a partition wall 160 to prevent a first fluid A introduced via the first supply part 111 from being introduced into the second through-hole 135. The partition wall 160 may be provided such that at least a portion of the second through-hole 135 is surrounded along a circumference of the second through-hole 135.

Each of partition walls 160, 161, and 162 may be extended from one surface of each of the fixed cones 130 such that the heights of the partition walls 160, 161, and 162 are smaller than intervals between the rotary cone 140 and the fixed cone 130. In an example, the partition wall 160 may be extended so as to have a height of about 10% of the interval between the rotary cone 140 and the fixed cone 130. In addition, the partition wall 160 may be extended so as to have a height of about 10% or less of the interval between the rotary cone 140 and the fixed cone 130. The partition wall 160 serves to divert the flow of the first fluid A so as to prevent the first fluid A flowing along a surface of the fixed cone 130 from passing through the second through-hole 135 and flowing to a lower part of the housing 110.

Referring to FIG. 5, the partition wall 161 may be formed such that a closed curve is formed along a circumference of the second through-hole 135. For example, the partition wall 161 may have a ring shape when viewed from an upper part of the housing 110.

Referring to FIG. 6, the partition wall 162 may be provided such that a portion of the partition wall 162 is opened along a circumference of the second through-hole 135. For example, the partition wall 162 may have a "U" shape when viewed from an upper part of the housing 110.

The aforementioned preferred embodiments of the present invention are shown by way of example. Those skilled in the art will appreciate that various modifications and changes can be made to the present invention without departing from the spirit and essential characteristics of the present invention, and it is to be appreciated that such modifications and changes are included in the accompanying claims.

INDUSTRIAL APPLICABILITY

Since a gas/liquid separator according to an example of the present invention includes fixed cones including through-holes through which a fluid flows, a stripping agent (e.g., steam) fed from a lower part of the separator and vaporized VOC can smoothly flow up to an upper part of the separator.

The invention claimed is:

1. A gas/liquid separator, comprising:
   a housing comprising a first supply part and a second supply part;
   a rotary shaft rotatably provided in the housing;
   a drive unit comprising a motor to rotate the rotary shaft;
   at least one fixed cone disposed in an interior of the housing and comprising a tilted area and a circumference area, wherein, when the at least one fixed cone comprises a plurality of fixed cones, the plurality of fixed cones have diameters which decrease in a direction from the first supply part to the second supply part, and wherein the at least one fixed cone comprises a first through-hole and at least one second through-hole, wherein the rotary shaft passes through the first through hole and a second fluid introduced via the second supply part passes through the at least one second through-hole; and
   at least one rotary cone disposed in an interior of the housing so as to be spaced apart from the at least one fixed cone and installed at the rotary shaft so as to rotate about the rotary shaft.

2. The gas/liquid separator according to claim 1, wherein a diameter of the first through-hole is larger than a diameter of the at least one second through-hole.

3. The gas/liquid separator according to claim 1, wherein the at least one fixed cone comprises a plurality of second through-holes.

4. The gas/liquid separator according to claim 1, wherein the at least one fixed cone comprises a partition wall to prevent a first fluid introduced via the first supply part from being introduced into the at least one second through-hole.

5. The gas/liquid separator according to claim 4, wherein the partition wall is provided so as to envelop at least a portion of the at least one second through-hole along a circumference of the at least one second through-hole.

6. The gas/liquid separator according to claim 4, wherein the partition wall extends from a surface of the at least one fixed cone so as to have a height smaller than an interval between the at least one rotary cone and the at least one fixed cone.

7. The gas/liquid separator according to claim 4, wherein the partition wall encircles a circumference of the second through-hole.

8. The gas/liquid separator according to claim 4, wherein a portion of the partition wall is open along a circumference of the second through-hole.

9. The gas/liquid separator according to claim 1, wherein the at least one second through-hole is disposed within the tilted area such that the at least one second through-hole is positioned between the circumference area of the at least one fixed cone and the first through-hole of the at least one fixed cone.

10. The gas/liquid separator according to claim 3, wherein the plurality of second through-holes are provided in a circumference direction with respect to the rotary shaft.

11. The gas/liquid separator according to claim 1, wherein the first supply part and the second supply part are disposed at different positions along a height direction of the housing.

* * * * *